US011712087B2

(12) United States Patent
Thompsett et al.

(10) Patent No.: US 11,712,087 B2
(45) Date of Patent: Aug. 1, 2023

(54) MULTIPLE LAYER UPPER FOR A SHOE

(71) Applicant: adidas AG, Herzogenaurach (DE)

(72) Inventors: Benjamin Alexander Thompsett, Nuremberg (DE); Raphael Curet, Nuremberg (DE); Ananda Aditya, Jakarta (ID); Quentin Ferrari, Erlangen (DE); No Kwang Park, Tangerang (ID)

(73) Assignee: adidas AG, Herzogenaurach (DE)

( * ) Notice: Subject to any disclaimer, the term of this patent is extended or adjusted under 35 U.S.C. 154(b) by 88 days.

(21) Appl. No.: 17/119,748

(22) Filed: Dec. 11, 2020

(65) Prior Publication Data

US 2021/0177097 A1 Jun. 17, 2021

(30) Foreign Application Priority Data

Dec. 16, 2019 (DE) .................... 10 2019 219 742.6

(51) Int. Cl.
*A43B 23/02* (2006.01)
*A43B 3/00* (2022.01)
*B29D 35/00* (2010.01)
*B29D 35/14* (2010.01)
*A43B 5/02* (2006.01)

(52) U.S. Cl.
CPC ........ *A43B 23/0235* (2013.01); *A43B 3/0047* (2013.01); *A43B 5/02* (2013.01); *A43B 23/0245* (2013.01); *B29D 35/0054* (2013.01); *B29D 35/146* (2013.01)

(58) Field of Classification Search
CPC ... A43B 5/025; A43B 23/0235; A43B 3/0047; A43B 5/02; A43B 7/085; A43B 7/146; A43B 11/00; A43B 23/027

USPC ........................................................... 36/133
See application file for complete search history.

(56) References Cited

U.S. PATENT DOCUMENTS

| 2,165,879 | A | * | 7/1939 | Wilkinson | ............... A43B 7/00 36/89 |
| 3,642,563 | A | * | 2/1972 | Davis | .................... D06M 17/10 428/317.1 |
| 6,065,654 | A | * | 5/2000 | Evensen | ................. A43B 11/02 223/112 |
| 8,950,087 | B2 | | 2/2015 | Baucom et al. | |
| 10,285,468 | B2 | | 5/2019 | Van Atta et al. | |

(Continued)

FOREIGN PATENT DOCUMENTS

| DE | 1149273 B | 5/1963 |
| KR | 1020070032569 A | 3/2007 |

OTHER PUBLICATIONS

Extended European Search Report issued in European Application No. 20213004.3, dated Apr. 23, 2021, 8 pages.

*Primary Examiner* — Sharon M Prange
*Assistant Examiner* — Grady Alexander Nunnery
(74) *Attorney, Agent, or Firm* — Sterne, Kessler, Goldstein & Fox P.L.L.C.

(57) ABSTRACT

The present invention relates to an upper for a shoe, including an inner layer; an outer layer overlapping the inner layer at least partially; wherein the outer layer includes a plurality of cuts; wherein the inner layer includes a plurality of protrusions; wherein each cut at least partially overlaps at least one protrusion; wherein each protrusion causes an extension in width of its corresponding cut when the shoe is worn.

20 Claims, 12 Drawing Sheets

(56) References Cited

U.S. PATENT DOCUMENTS

2010/0299967 A1* 12/2010 Atsumi .................... A43B 5/02
                                                                36/133
2016/0037862 A1   2/2016 Beye et al.
2016/0095389 A1   4/2016 Minami et al.
2016/0227881 A1*  8/2016 Beers ................... A43B 23/028
2016/0309834 A1  10/2016 Zwick et al.

* cited by examiner

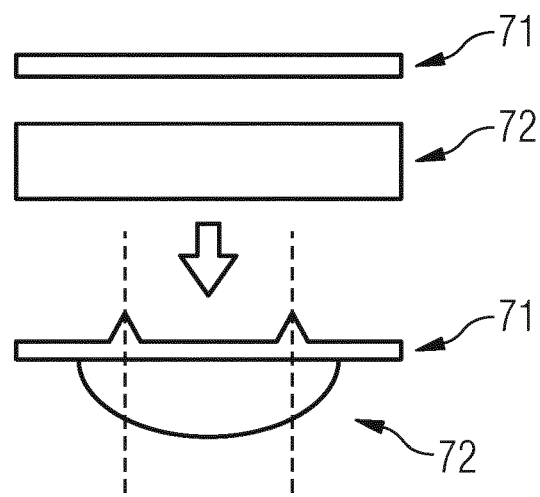
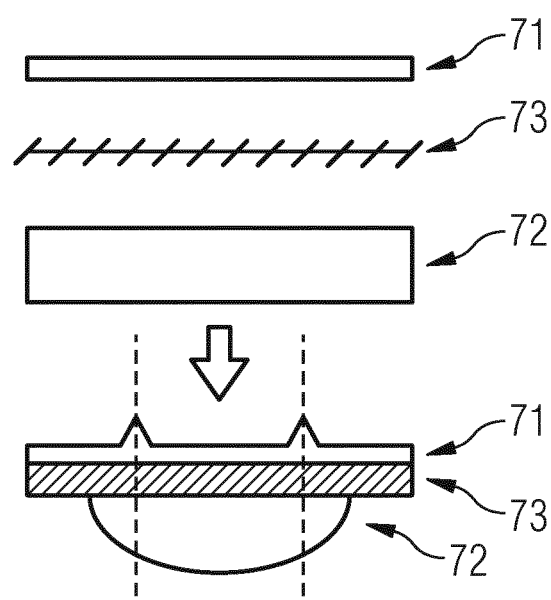

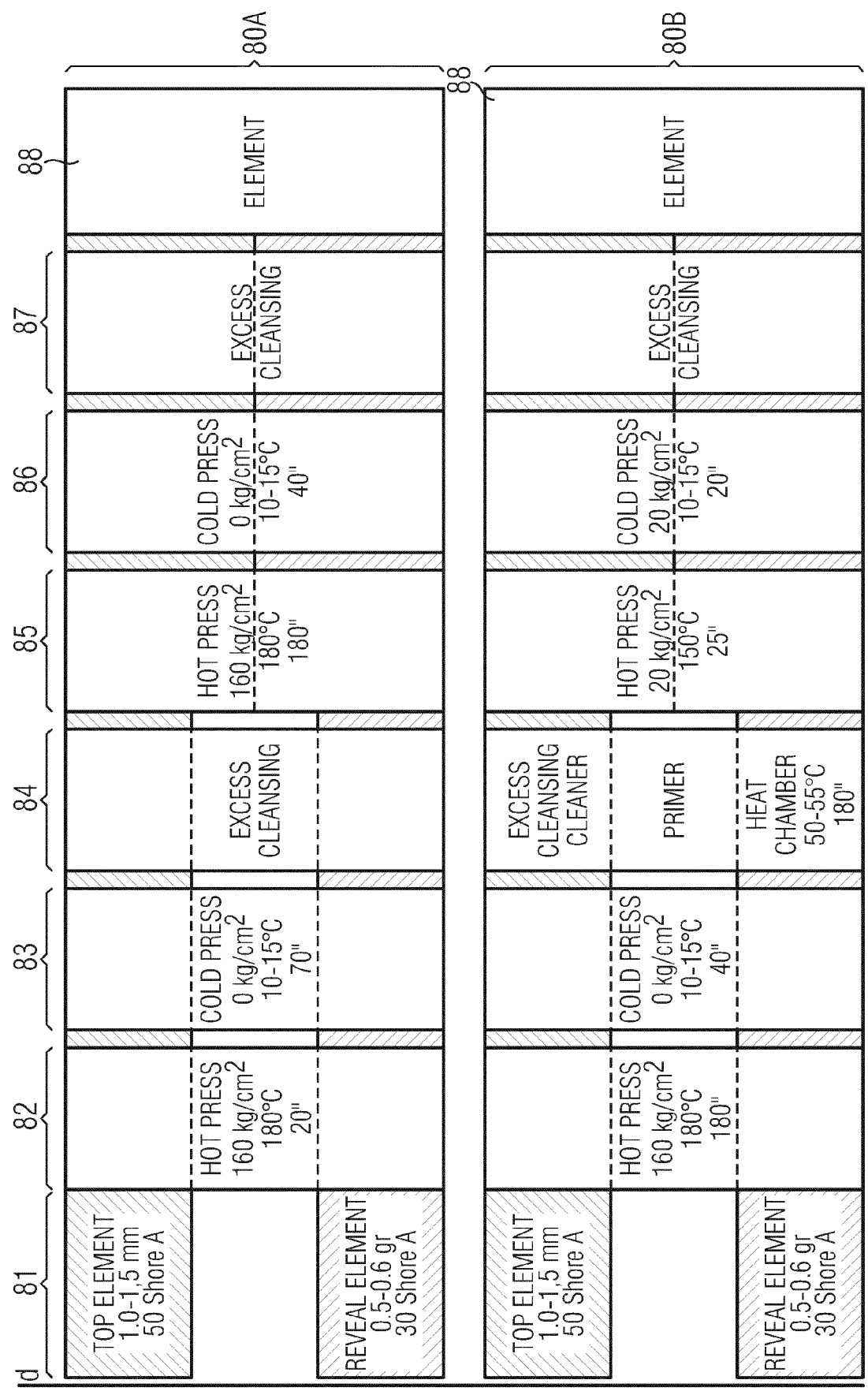

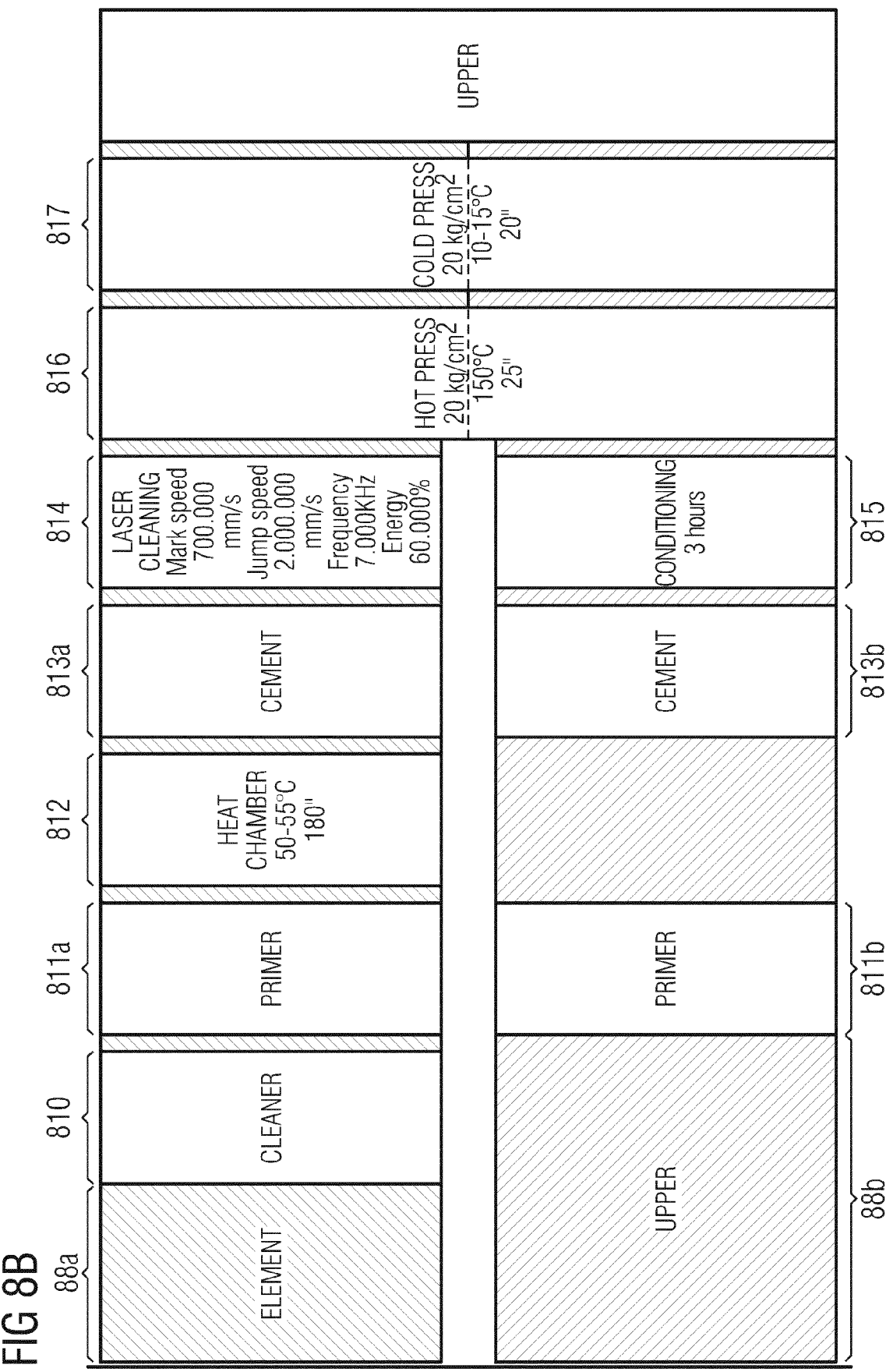

MULTIPLE LAYER UPPER FOR A SHOE

TECHNICAL FIELD

The present invention relates to an upper for a shoe and a method of manufacturing an upper for a shoe.

TECHNICAL BACKGROUND

A common way for describing an article of footwear is the combination of an upper and a sole structure. In general, the upper covers the instep, the toes, the lateral and medial side, and the heel, and provides an opening to allow the wearer to step inside the footwear. The sole is connected to the upper such that its top side faces the foot and its bottom side touches the ground.

Particularly athletic footwear should be comfortable to wear, stabilize the foot and attenuate the stress from the bounce between the foot and the ground when doing exercises. The footwear should support the movement and should avoid physical injury of the wearer.

Specifically, in soccer and other ball sports, where the contact of the shoe with the ball is a focus, the surface of the shoe upper plays an important role. In the case of kicking, maximum energy transfer is beneficial which motivates the increase of the friction between the soccer shoe and the ball. One way to realize an increase in the coefficient of friction between boot and ball is to provide a textured surface on an exterior surface of the shoe upper.

However, in wet weather conditions the moisture leads to a decrease of the friction as the water stays on the exterior surface of the shoe upper, which can reduce the contact area between boot and ball.

It is therefore an object of the present invention to provide a shoe for ball sports, in particular for soccer, with an increased surface friction, particular in case of humid environmental conditions.

U.S. Pat. No. 9,572,396 B2 relates to a forefoot upper including a cutout region through what is generally inelastic outer shoe material, across which a panel of increased stretch extends in juxtaposition with a key shoe-foot impact or pressure engagement area.

U.S. Pat. No. 10,285,468 B2 is directed to an article of footwear including projection members providing sensory feedback, which may be configured such that they are inserted into apertures located on the upper and extend above an outer surface of the upper. The article of footwear has an upper with a textured surface for an ability to control an object.

U.S. Pat. No. 7,392,605 B2 relates to a footwear with an upper including an exterior layer and an interior layer. The exterior layer includes a plurality of incisions that extend through the exterior layer.

U.S. Pat. No. 9,254,014 B2 is directed to a boot including an opening, such as a slit, which is positioned to allow for flexibility when a wearer inserts or removes a foot.

US 2016 0 309 834 A1 relates to a shoe for ball sports with an upper having an outer surface and an actuator configured to change at least one surface property.

SUMMARY

The above-mentioned problem is solved by an upper for a shoe including: an inner layer, an outer layer overlapping the inner layer at least partially, wherein the outer layer includes a plurality of cuts, wherein the inner layer includes a plurality of protrusions, wherein each cut overlaps at least partially at least one protrusion, wherein each protrusion causes an extension of width of its corresponding cut, when the shoe is worn.

The extension of width of the cuts caused by the protrusions provides an increasing of the contact area between the shoe and the ball leading to an increased friction with a ball and improved ball control, particularly in wet conditions. Further, the cuts in the outer layer help to form moisture or water channels which move water away from the top surface such that the outer layer to stay dry. This means a consistent surface contact area between boot and ball is retained even when moisture is present. This further improves friction and ball control, especially when wearing a soccer shoe, e.g., during rain.

According to the present invention, the width of the cuts of the outer layer extends or expands when a wearer inserts a foot into the upper and pressure exerted by the foot onto the inner layer forces the inner layer to move outwards.

In the context of the present invention, a partial overlap between a protrusion and a cut is understood as a partial overlap when looking at the cut in a direction defined by a surface normal of the outer layer.

The inner layer may be a full, continuous layer. Alternatively, the inner layer may include two or more portions. The portions may be connected or unconnected. Each portion may correspond to one protrusion.

In the context of the present invention the shoe may be a shoe for ball sports. More particularly, the shoe may be a soccer shoe. However, in further embodiments the shoe may be a shoe for rugby or American football.

The outer layer and/or the inner layer may include rubber. Rubber has several advantages such as waterproofness, durability and very good foot-to-ball interaction. Moreover, rubber can be molded.

The inner layer may include a foam material. For example, EVA, TPU or particles foams (e.g. ePEBA, eTPEE or eTPU) can be used. These materials provide an improved thermal insulation.

The material of the outer layer and the inner layer may include different hardnesses. The combination of materials with different hardnesses leads to a number of preferred properties.

The material of the outer layer may include a greater hardness in comparison to the inner layer. In a preferred embodiment, the outer layer includes a hardness of 50-70 Shore A and the inner layer includes a hardness of 20-50 Shore A. An increased hardness of the surface of the upper leads to a better energy transfer from the surface of the upper to the ball.

The material of the outer layer and the inner layer may include different thicknesses. The combination of materials with different thicknesses leads to a well-matched dynamic behavior as well as the advantage to reduce weight of the shoe upper.

The upper may include a lining arranged underneath the inner layer. A lining underneath the protrusions avoids or at least reduces blisters and provides for additional wearing comfort.

The upper may further include a textile layer arranged between the outer layer and the inner layer. By arranging an additional textile layer between the outer layer and the inner layer the thickness of these layers, which may include, e.g., comparably heavy rubber material, can be decreased. This results in a comparably lightweight shoe. A reduction of the weight also adds to the wearing comfort of the shoe and performance. Additionally, a film layer can be added to the back or top surface of the textile to further reduce required rubber and also to help improve shoe durability.

The textile layer may include a plurality of cuts which coincide with the cuts of the outer layer. The cuts are essential for forming the moisture and/or water channels. By having cuts in the textile layer coinciding with the cuts of the outer layer, the drain effect can be increased.

An alternative way is to attach the inner layer directly to the outer layer. The textile is bonded on the backsides of theses layers. If there are holes in the textile and the inner layer includes a plurality of unconnected portions arranged inside the holes, the textile covers only the outer layer. Otherwise, the textile may cover both layers, the inner and the outer layer.

An exterior texture of the outer layer may include a plurality of protrusions. If the texture of the outer surface of the upper is characterized by protrusions adhesion is increased. Thus, for example in case of soccer it is possible to impact more spin to a ball or increase ball rotation when kicking.

The protrusions of the inner layer may face inwards, such that they point in the direction of a foot of a wearer of the shoe. The inwardly facing protrusions apply a force to the foot of a wearer causing tactile sensation or sensory feedback when a ball hits the shoe. This may further improve ball control.

Generally, the protrusions of the inner layer may have any shape. In some embodiments the protrusions of the inner layer may include a hemispherical shape, an elongated shape, and/or a rib shape. These shapes are easy to manufacture and provide an efficient extension in width of the corresponding cut.

The inner layer may include at least two unconnected portions, wherein each portion includes at least one protrusion. As in this embodiment the inner layer is not continuous, a further decrease of weight can be achieved.

The protrusions of the inner layer may include a plurality of cuts which coincide with the cuts of the outer layer. In this way, the friction between the outer surface of the upper and a ball is even more increased and water displacement is more efficient.

The upper may further include a textile layer arranged on an outer surface of the outer layer. This outer textile layer may further provide an alternative coefficient of friction between boot and ball, allowing for the friction properties to be further tuned.

The inner layer may only be arranged on a medial and/or lateral side of the upper. This leads to a defined region, where the main contact with the ball occurs.

The present invention also relates to a shoe including an upper as described herein and a sole attached to the upper. The shoe is light and provides a good control of the foot-to-ball interaction in particular in wet conditions.

The present invention also relates to a method of manufacturing an upper for a shoe, including the following steps: providing an inner layer, providing an outer layer, such that the outer layer overlaps the inner layer at least partially, providing a plurality of cuts in the outer layer and providing a plurality of protrusions on the inner layer, such that each cut overlaps at least partially at least one protrusion and such that each protrusion causes an extension of width of its corresponding cut when the shoe is worn.

The advantages of such an upper have been described above and will not be repeated here for reasons of brevity.

The method may further include the steps: providing a compression mold with two cavities and three plates, placing the outer layer in a first cavity between a first plate and a second plate and placing the inner layer in a second cavity between the second plate and a third plate. This allows to produce the inner and the outer layer including the plurality of protrusions in one manufacturing step. Thus, a simple and fast way of manufacturing can be achieved.

The method may further include the steps: providing a compression mold with three cavities and four plates, placing the outer layer in a first cavity between a first plate and a second plate, placing the textile layer in a second cavity between the second plate and a third plate and placing the inner layer in a third cavity between the third plate and a fourth plate. This allows production of the inner and the outer layer including the plurality of protrusions as well as placing the additional textile layer in between in one manufacturing step.

The method may further include the steps: providing that one of the mold plates acts as a cutter. In this way it is assured, that the cuts of the outer layer and/or the textile layer and the protrusions of the inner layer are on the same positions without any relative shift.

In an alternative embodiment, the cuts are die-cutted in a separate process after the different layers have been assembled using a die-cutter and a press. The cuts can create a "reveal" effect in the sense that the protrusions of the inner layer are revealed when the wearer inserts a foot into the shoe. In addition, the cuts may provide visual designs, for example trademarks or logos.

The method may further include the steps: placing the inner layer and the outer layer in a mold at a first temperature and subsequently placing the inner layer and the outer layer in a mold at a second temperature, wherein the first temperature is higher than the second temperature. With the combination of a hot mold process and a cold mold process very specific mechanical properties can be achieved, and the durability and quality of the finished component can also be improved. The first temperature may be in a range of 150-180° C. and the second temperature may be in a range of 10-15° C.

The provided outer and/or inner layer may include rubber. Using rubber enables a fast and cost-efficient way of manufacturing the upper. Through the molding process, it is possible to modify the shape of the rubber as well as the physical properties like tensile strength by varying the temperature, the pressure-holding time and/or the compression pressure, as well as modifying the raw rubber composition itself.

The advantages of the following embodiments of the method of manufacturing an upper for a shoe have already been described above in the context of the description of the upper. To avoid redundancies, they will not be repeated again.

In the method of manufacturing an upper for a shoe, the material of the outer layer and the material of the inner layer may include different hardnesses.

In the method of manufacturing an upper for a shoe, the material of the inner layer may include foam material.

In the method of manufacturing an upper for a shoe, the material of the outer layer may include a greater hardness in comparison to the inner layer.

In the method of manufacturing an upper for a shoe, the material of the outer layer and the inner layer may include different thicknesses.

The method of manufacturing an upper for a shoe, may further include the step: arranging a lining underneath the inner layer.

The method of manufacturing an upper for a shoe, may further include the step: arranging a textile layer between the outer layer and the inner layer.

The method of manufacturing an upper for a shoe, may further include the step: providing a plurality of cuts coinciding with the cuts of the outer layer of the textile layer.

The method of manufacturing an upper for a shoe, may further include the step: providing an exterior texture of the outer layer with a plurality of protrusions.

The method of manufacturing an upper for a shoe, may further include the step: arranging the protrusions of the inner layer facing inwards such that they point in the direction of a foot of a wearer of the shoe.

In the method of manufacturing an upper for a shoe, the shape of the protrusions may include a hemispherical shape, an elongated shape, and/or a rib shape.

In the method of manufacturing an upper for a shoe, the inner layer may include at least two unconnected portions, wherein each portion includes at least one protrusion.

The method of manufacturing an upper for a shoe, may further include the step: arranging a textile layer on an outer surface of the outer layer.

The method of manufacturing an upper for a shoe, may further include the step: arranging the inner layer only on a medial side of the upper.

The method of manufacturing an upper for a shoe, may further include the step: providing the inner layer with a plurality of cuts coinciding with the cuts of the outer layer.

Another aspect of the present invention relates to an upper for a shoe including an inner layer, an outer layer overlapping the inner layer at least partially. Wherein the outer layer includes a plurality of cuts, wherein the inner layer includes a plurality of protrusions, wherein each cut is associated with at least one protrusion, wherein the inner layer is movable with respect to the outer layer between a first position and a second position, wherein in the first position, the protrusions are covered by the outer layer and wherein in the second position, each protrusion protrudes through its associated cut at least partially.

The extension in width of the cuts caused by the protrusions provides an increasing of the contact area between the shoe and the ball leading to an increased friction between the boot and ball and improved ball control, particular in wet conditions. Further, the cuts in the outer layer help to form moisture or water channels which move water away from the top surface such that the outer layer stays dry. This means a consistent surface contact area between boot and ball is retained even when moisture is present. This further improves friction and ball control when wearing the shoe, e.g., during rain. The movable inner layer extends to the heel region such that an automatic lock-down can be achieved, when a shoe is inserted.

The opposing edges of the cuts in the first position of the inner layer need not necessarily abut. Rather, the cuts may be characterized as apertures, wherein in the second position of the inner layer the protrusions of the inner layer protrude through these apertures at least partially.

The upper may include a stretchable piece, wherein the stretchable piece connects the inner layer to the outer layer and/or an optional lining. The stretchable piece provides some guidance to the movable inner layer and facilitates retracting the movable inner layer.

The stretchable piece may be located in the forefoot region of the upper. To avoid that the inner layer is expanded only over the toes by pulling, the stretchable piece is located in the forefoot region, where most of the tension occurs.

The inner layer may include a non-stretchable material. "Non-stretchable" in this context means that the inner layer has less stretch than the outer layer. This ensures that the distances between the protrusions remain constant, even under tension, so that the correspondence between the protrusions of the inner layer and the cuts in the outer layer is maintained.

The inner layer may include thermoplastic polyurethane (TPU). TPU combines an elastomer-like dynamic behavior with the advantages of a thermoplastic manufacturing. Moreover, TPU can reach the preferred hardness.

The inner layer may form a lug at the heel region. By pulling the inner layer by means of the lug a dynamic lock-down of the foot is created, and the raised protrusions through the cuts is achieved.

The stretchable piece and/or the inner layer and/or the outer layer may include rubber. Rubber has several advantages such as waterproofness, durability and very good foot-to-ball interaction. Moreover, rubber can be molded and co-molded with other materials including textiles.

The first position of the movable inner layer may be an initial position. The initial position describes the situation, when the protrusions are covered by the outer layer. In this case no foot is inserted.

The second position of the movable inner layer may be reached when the shoe is worn and the wearer's heel pushes against the lug so that the inner layer moves in a backward direction relative to the outer layer. In this position the protrusions protrude through the cuts of the outer layer of the upper. In this way, an automatic lock-down can be achieved.

By means of the visible protrusions the soccer player has additional control elements, which increase the friction between the shoe and the ball. Particularly, in humid weather conditions the cuts of the outer layer form channels, which displace water from the upper outer surface.

The outer layer may include a textile layer coated on both sides. By reducing the amount of rubber by substituting most of the rubber by a textile, a lighter shoe can be achieved. To conserve the preferred properties of rubber the textile is coated.

The cuts in the coatings of the outer layer may be smaller than the cuts in the textile layer. With the smaller cuts, the coating prevents the textile layer from fraying and water absorption. Further, the different dimensions of the cuts lead to the effect that the upper and lower coatings are in direct contact with each other such that no textile is exposed directly to external contact.

The material of the outer layer and the inner layer may include different hardnesses. The combination of materials with different mechanical properties enable a number of preferred properties of the shoe.

The material of the outer layer may include a greater hardness in comparison to the inner layer. An increased hardness of the upper leads to a better energy transfer from the upper to the ball.

The upper may further include a lining arranged underneath the inner layer.

The lining is connected with the inner layer over the non-stretchable piece. In this way, the inner layer may move relative to the lining. Therefore, the lining avoids injuries of a wearer because of the moving of the inner layer.

The outer side of the outer layer may further include a texture, which includes a plurality of protrusions. The protrusions enhance the adhesion strength such that in case of soccer it is possible to give the ball a spin during the kicking.

The protrusions of the inner layer may point outwards, such that they protrude through the cuts of the outer layer, when the inner layer is in the second position. The dynamic lock-down of the protrusions is facilitated by the wearer's heel pushing against the lug at the heel region.

The upper may further include a textile layer arranged on an outer surface of the outer layer. By means of the auxiliary textile layer the traction of the upper can be increased.

The protrusions of the inner layer may only be arranged on the medial side of the upper. The protrusions are needed in a region, where the main contact with the ball occurs. Hence the medial side is defined as the kicking zone and the protrusions are mainly located there.

The present aspect of the invention also relates to a shoe which includes an upper as described herein and a sole attached to the upper. The shoe is light, provides a good control of the foot-to-ball interaction in particular under humid conditions and is adaptable by means of the dynamic lock-down described herein. The player can automatically induce the dynamic lock-down by just stepping inside the shoe.

The present aspect of the invention may further relate to a method of manufacturing an upper for a shoe, including the following steps: providing an inner layer, providing an outer layer, such that the outer layer overlaps the inner layer at least partially, providing a plurality of cuts in the outer layer, providing a plurality of protrusions on the inner layer, such that each cut is associated with at least one protrusion, providing a movable inner layer with respect to the outer layer between a first position and a second position such that in the first position the protrusions are covered by the outer layer and in the second position, each protrusion protrudes through its associated cut at least partially.

The method may further include the steps: providing a compression mold with at least two plates. This allows to produce the inner and the outer layer including the plurality of protrusions in an easy and fast way.

The holes in the textile layer of the alternative embodiment of FIG. 9 would either be laser cut before attaching film to the top and backside (with a small overlap between the film layers to protect the textile edge) or engineered into the textile layer before attaching the film.

The advantages of the following embodiments of the method of manufacturing an upper for a shoe have already been described above in the context of the description of the upper. To avoid redundancies, they will not be repeated again.

The material of outer layer and the inner layer may include different hardnesses.

The material of the outer layer may include a greater hardness in comparison to the inner layer.

The method may further include the step of providing a stretchable piece which connects the inner layer to the outer layer and/or an optional lining at least partially.

The method may further include the step of placing the stretchable piece in the forefoot region of the upper.

The inner layer may include a non-stretchable material.

The inner layer may include TPU.

The stretchable piece and/or the inner layer and/or the outer layer may include rubber or a rubber and textile composite.

The method may further include the step of forming the inner layer in the heel region as a lug.

The method may further include the steps of forming the outer layer as a textile layer and coating the textile layer on both sides.

The method may further include the step of forming the cuts in the coatings of the outer layer smaller than the cuts in the textile layer.

The method may further include the step: arranging a lining underneath the inner layer.

The method may further include the step: arranging a lining beneath both the outer layer and the inner layer.

The method may further include the step: providing the outer side of the outer layer with a texture, which includes a plurality of protrusions.

The method may further include the step of arranging the protrusions of the inner layer such that the protrusions face outwards and protrude through the cuts of the outer layer when the inner layer is in the second position.

The method may further include the step: arranging a textile layer on an outer surface of the outer layer.

The method may further include the step: arranging the protrusions only on the medial side of the upper.

BRIEF DESCRIPTION OF THE FIGURES

In the following, exemplary embodiments of the invention are described with reference to the figures. These figures show:

FIG. 7A: A graphical illustration of a manufacturing process of an upper according to the invention with an outer layer and an inner layer, wherein the inner layer features protrusions;

FIG. 7B: A graphical illustration of another embodiment of a manufacturing process of an upper according to the invention showing an outer layer, a textile layer and an inner layer, wherein the textile layer is positioned between the inner layer and the outer layer and the inner layer features protrusions;

FIG. 8A: A graphical illustration of two manufacturing processes of an upper ("element") according to the present invention.

FIG. 8B: A graphical illustration of a manufacturing process of an upper ("upper") according to the present invention;

DETAILED DESCRIPTION

Possible embodiments of the present invention will be described in the following detailed description primarily with reference to a shoe. It is emphasized, that the present invention is not limited by these embodiments.

Figure 1:
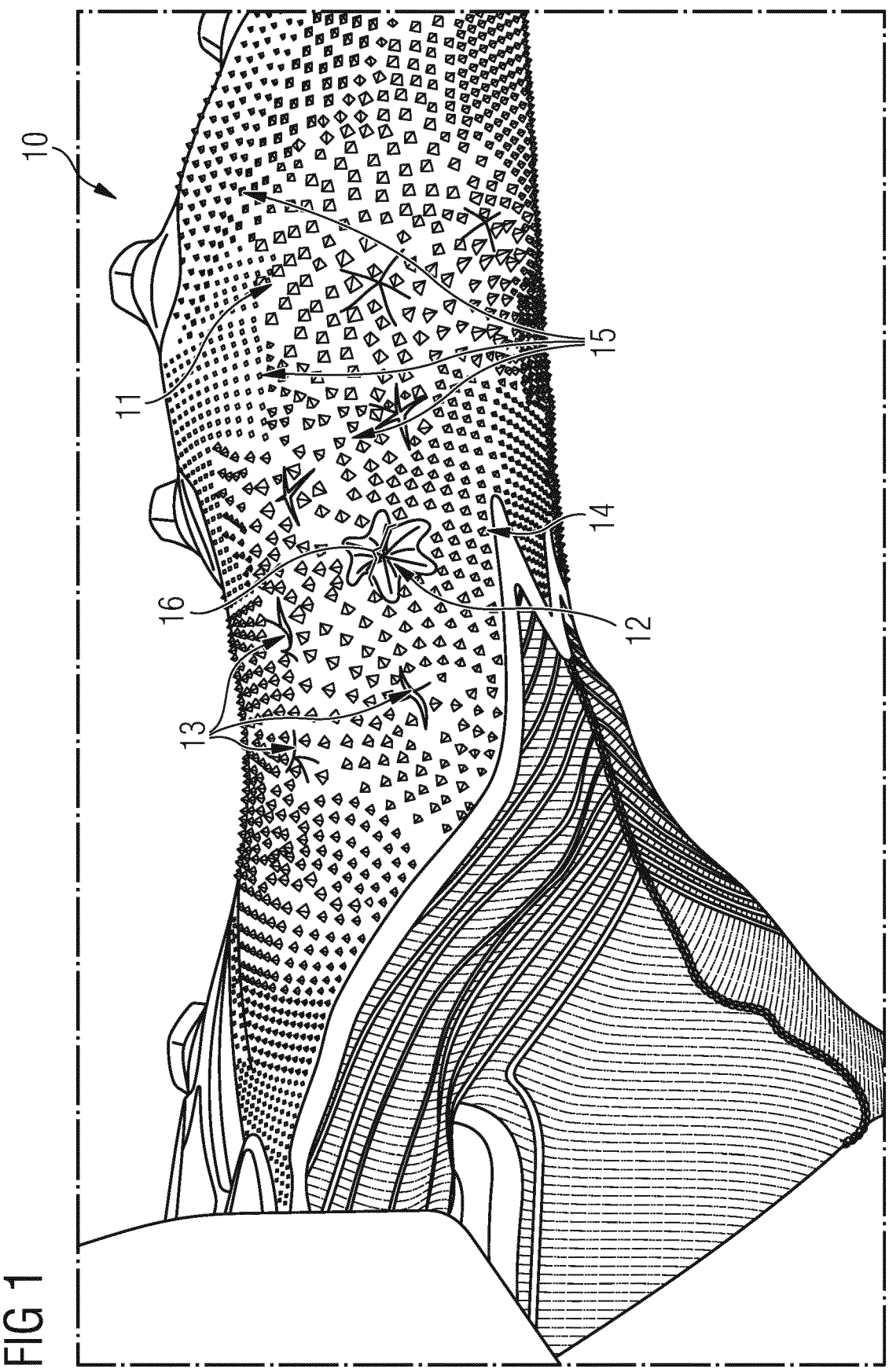
FIG. 1: An example of a preferred embodiment showing a shoe according to the invention.

FIG. 1 shows an embodiment of an upper 14 of a shoe 10 according to the present invention. The upper 14 includes an inner layer 12 and an outer layer 11 made essentially of rubber. In another embodiment the inner layer can may be made at least partially of foam materials such as EVA, TPU or particles foams (e.g. ePEBA, eTPEE or eTPU). The upper 14 is connected to a shoe sole. The outer layer 11 includes a plurality of cuts 13 and is overlapping the inner layer 12 at least partially. In some embodiments at least one additional textile layer can be arranged on top of the outer layer, between the inner and outer layer and/or underneath the inner layer.

The inner layer 12 may include a plurality of protrusions including shapes that can be described as hemispheres. In other embodiments the protrusion may include a spike-like shape, a rectangular shape, or a rib shape. Generally, the protrusion may have any arbitrary shape. The protrusions point inwardly, such that they face a wearer's foot when the shoe 10 is worn. In different embodiments the protrusions may be arranged in a different pattern, have different shapes or point in the opposite direction, e.g., such that their flat sides point inwardly. In the preferred embodiment the inner layer includes plurality of non-connected protrusions. In other embodiments the inner layer may include a continuous layer, wherein the at least two protrusions are connected to the continuous layer. In another embodiment the protrusions can may be connected to each other such that they form a perforated layer.

The protrusions of the inner layer 12 extend into the cavity formed inside the upper such that the wearer can feel these protrusions as they exert a pressure onto the foot of the wearer, when the shoe 10 is worn. The wearer is pushing with the foot against the inwardly facing protrusions, causing the inner layer 12 to move outwards and partially through the cuts 13 of the outer layer 11 as shown in FIG. 1. During this process the inner layer 12 forces the cuts 13 of the outer layer 11 to extend. Therefore, when the shoe is worn, each protrusion causes an extension of width 16 of its corresponding cut.

The cuts 13 in the outer layer 11 of the exemplary embodiment of FIG. 1 have a star-shaped pattern. Different shapes of the cuts are possible, for example a straight line, cross-shaped, V-shaped, etc. In the exemplary embodiment, additional cuts on the flat side of the protrusions of the inner layer 12 coincide with the cuts 13 of the outer layer 11. These cuts do not penetrate the inner layer 12 completely. In other embodiments, the protrusions may not have such additional cuts.

The outer layer 11 of the exemplary embodiment shown in FIG. 1 includes a texture which features a plurality of protrusions 15. These protrusions have a shape of a triangular pyramid and are arranged in different configurations. The height of the protrusions generally varies, such that the highest protrusions are located in the midfoot area.

Figure 2A:
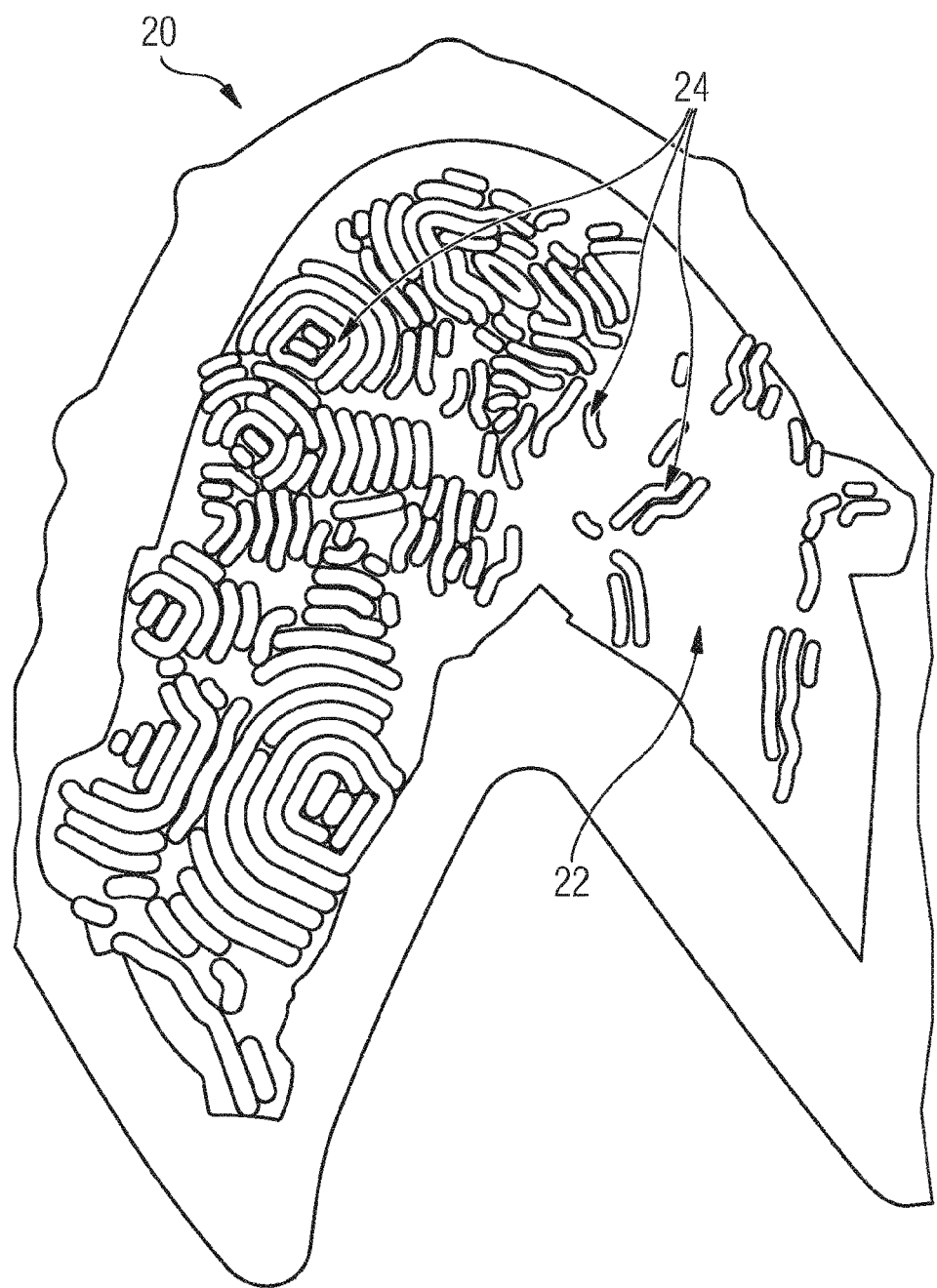
FIG. 2A: Another example of a preferred embodiment showing three layers of a shoe upper according to the invention with an outer layer, a textile layer and an inner layer, wherein the inner layer is shown on top.
Figure 2B:
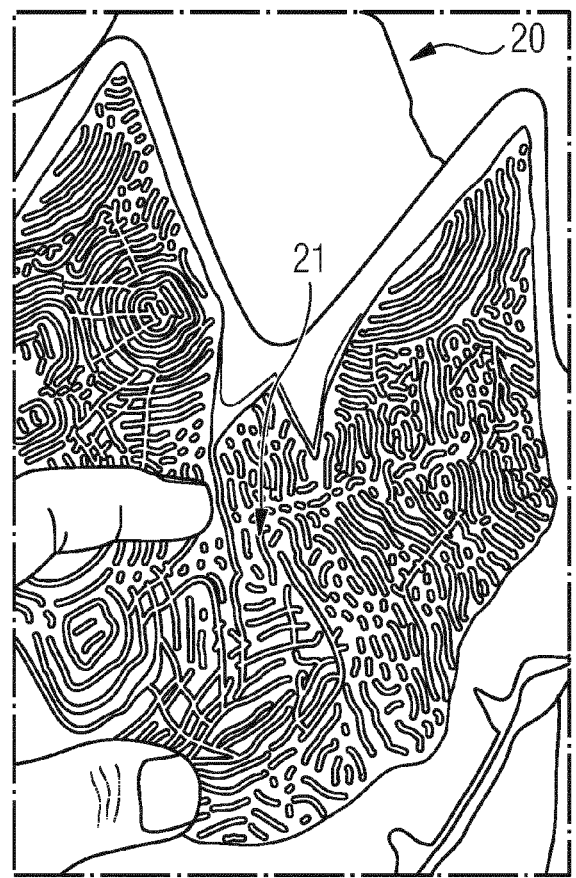
FIG. 2B: The example of FIG. 2A, wherein the outer layer is shown on top and no pressure forces the inner layer to move outwards.
Figure 2C:
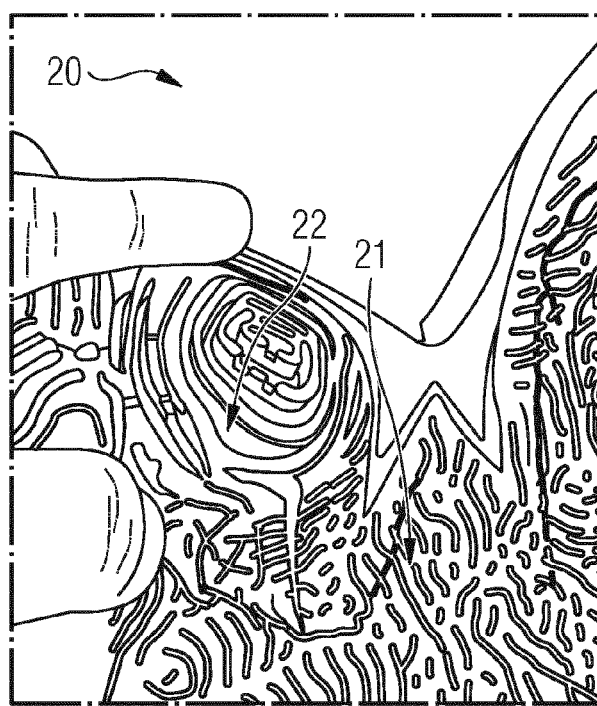
FIG. 2C: The example of FIG. 2B, wherein a pressure forces the inner layer to move outwards.

The principle of the present invention is demonstrated in the embodiment, which is shown in the FIGS. 2A, 2B and 2C, wherein FIGS. 2B and 2C show the outer side and FIG. 2A shows the inner side of a shoe upper 20 according to the invention. In the final upper, the inner side will face a foot of a wearer, whereas the outer side will make contact with a ball.

The upper 20 shown in FIGS. 2B and 2C includes an outer layer 21 and an inner layer 22 made of rubber. These layers are attached to each other. The outer layer 21 features a texture of channels and recesses that resembles an organic arrangement. As shown in FIG. 2B and (more pronounced) in FIG. 2C, some of the channels or recesses include cuts such that the inner layer 22 is visible through the cuts under certain conditions that will be described below.

The inner layer 22 is characterized by a plurality of protrusions 24, which are shown in FIG. 2A. The protrusions point inwards in the direction of a wearer's foot. The protrusions have the shape of elongated small rods. Most of the protrusions 24 are arranged adjacent to each other, such that small channels are formed between adjacent protrusions 24. The protrusions 24 are located in such a way, that a protrusion of the inner layer 22 coincides with a channel or recess of the outer layer 21.

This configuration leads to the effect, that when no force is acting on the protrusions of the inner layer 21, the inner layer is generally not visible through the outer layer (see FIG. 2B). When exerting a force on the protrusions of the inner layer 21 from the inside of the upper 20, the inner layer 21 becomes visible between the protrusions of the outer layer 22 (see FIG. 2C). Due to the pressure on the inwardly pointing protrusions, in direction to the outer side of the upper, the inner protrusions are forced outwards such that the cuts in outer layer extend in width 16. Due to the extending cuts the inner layer 21 becomes visible and changes the texture of the outer side of the upper 20.

Figure 3:
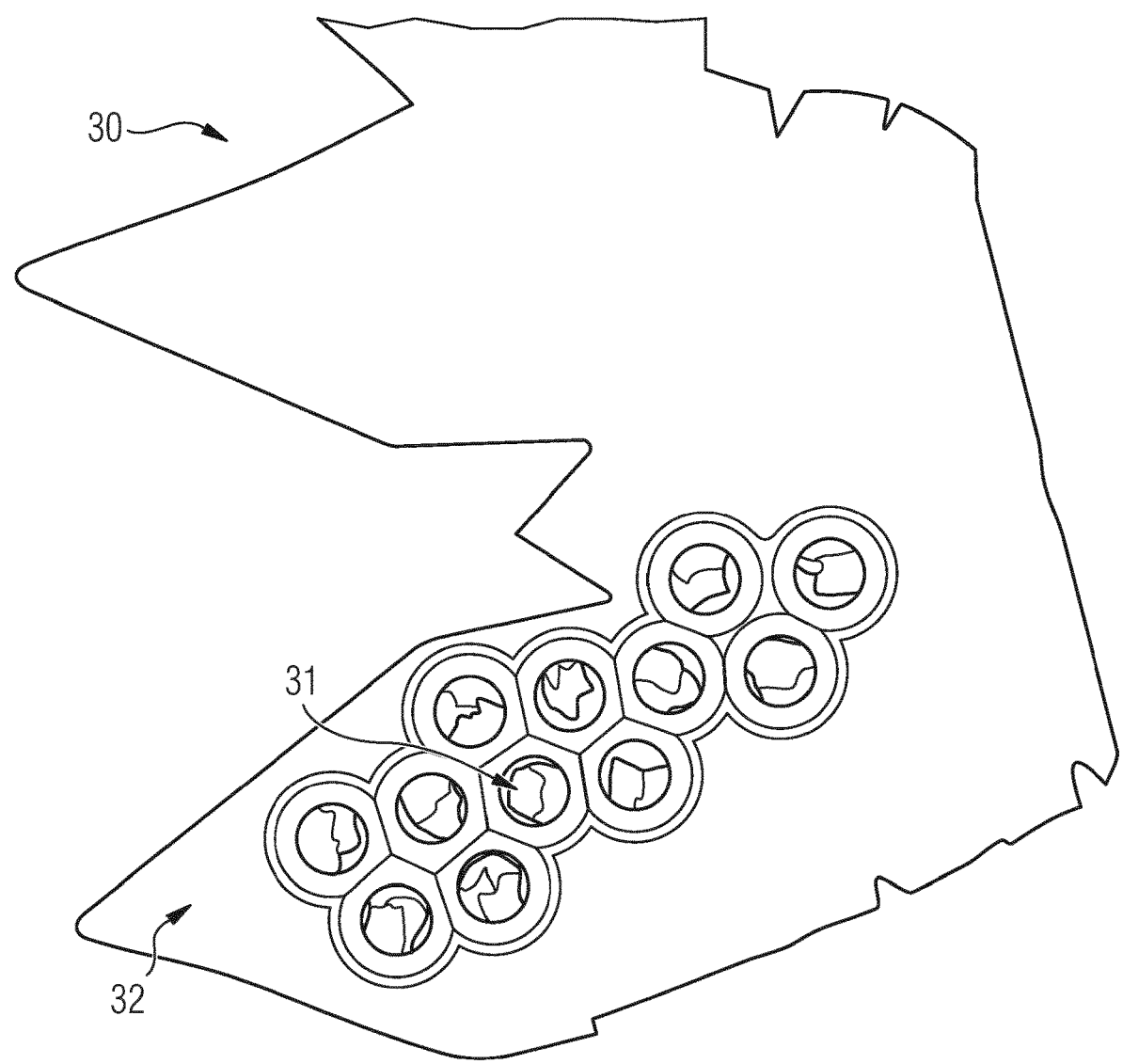
FIG. 3: Another example of an embodiment showing three layers of the shoe upper according to the invention with an outer layer, a textile layer and an inner layer, wherein the inner layer features a plurality of protrusions.

FIG. 3 shows another example of an embodiment of a shoe upper according to the present invention. The upper 30 includes three layers: an inner layer 31, an outer layer (visible in FIG. 4) and a textile layer 32 arranged between the inner layer 31 and the outer layer. The inner layer 31 includes a plurality of protrusions, which are not connected to each other. The protrusions have a hemispherical shape and are arranged such they will point into the cavity of the final upper facing the foot of a wearer.

Figure 4:
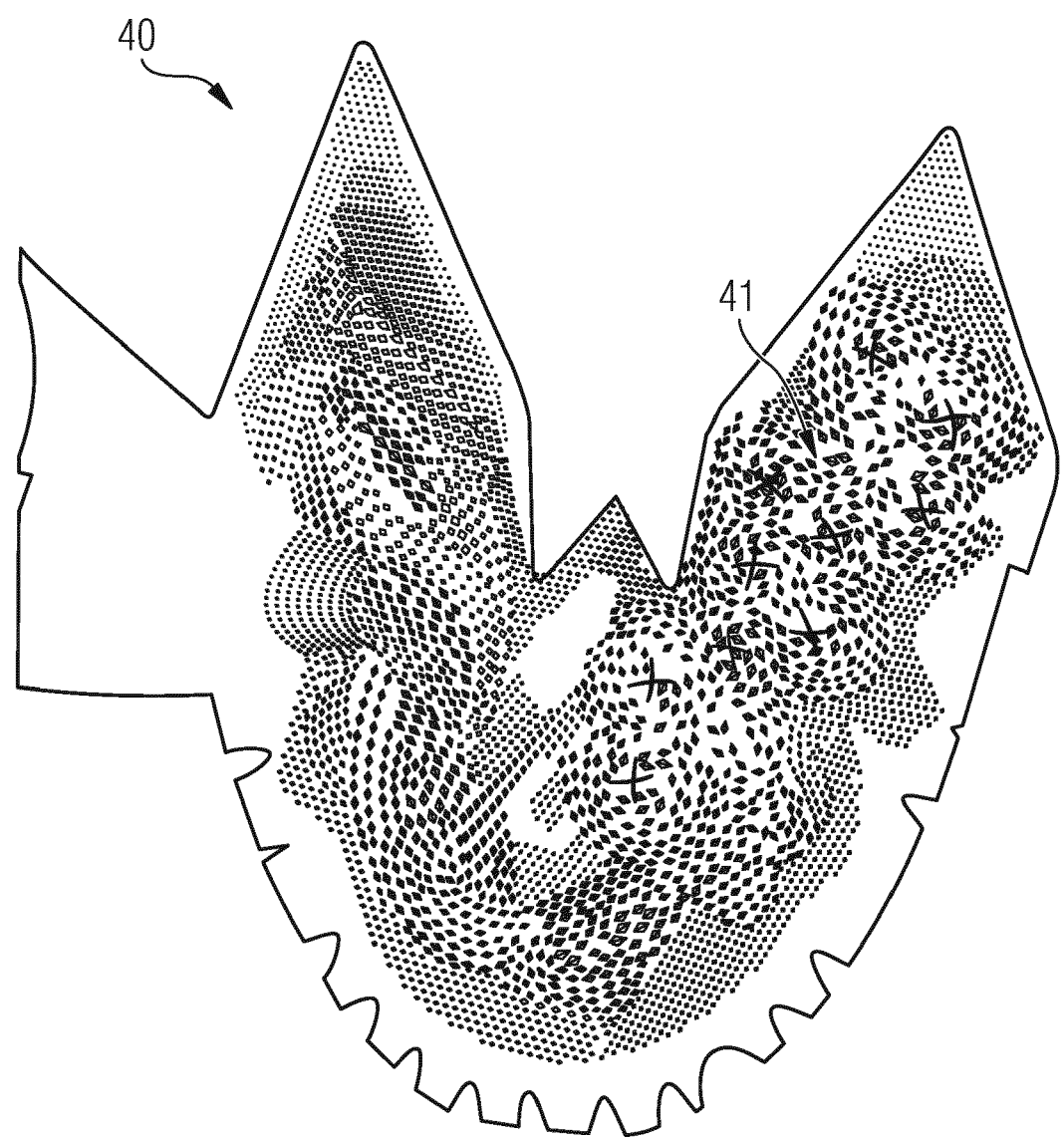
FIG. 4: The opposite side of the shoe upper of FIG. 3 according to the invention, wherein the outer layer features a texture.

FIG. 4 shows the other side of the embodiment of FIG. 3, which includes an outer layer 40 of an upper according to the present invention, wherein a surface of the outer layer 40 includes a texture 41. This texture is characterized by a plurality of protrusions in different dimensions, which causes an increase of friction. The protrusions form a pattern on an exterior surface of the outer layer 40 such that the control of the foot-to-ball interaction can be increased, for example, giving a ball a spin during kicking.

Figure 5:
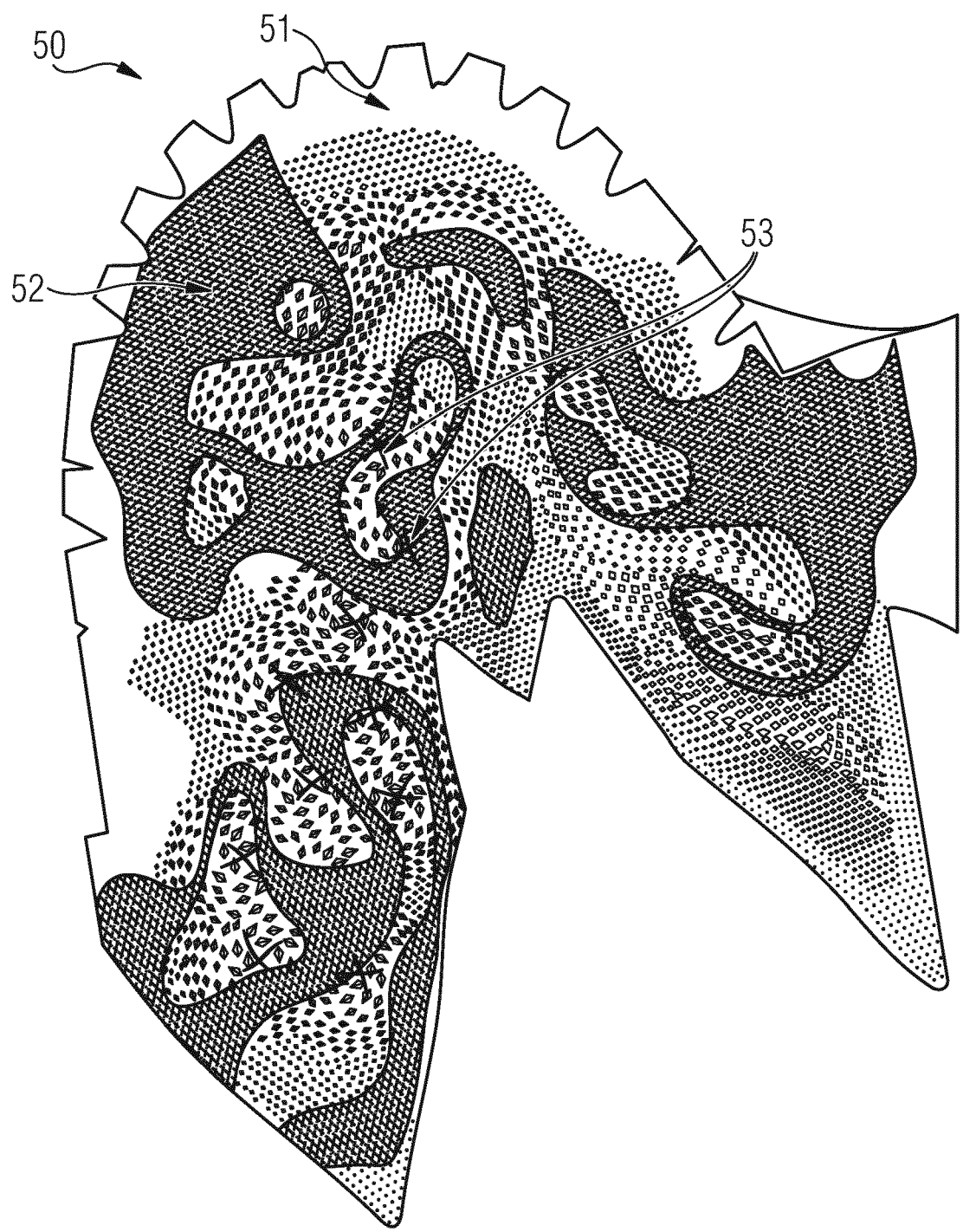
FIG. 5: Another example of an outer layer of a shoe upper according to the invention, wherein the outer layer features a texture and is covered at least partially with an additionally layer.

FIG. 5 shows another embodiment of an outer layer 50 of an upper according to the present invention, wherein a surface of the outer layer includes a textile layer 51 on top of a textured surface 52. The outer layer includes a plurality of cuts 53 and the textile layer 51 includes a plurality of cuts 53 too, which coincide with the cuts 53 of the outer layer. The textile layer 51 covers the exterior surface of the upper at least partially. The covered regions are subject to a higher tension in comparison to the uncovered regions.

Figure 6A:
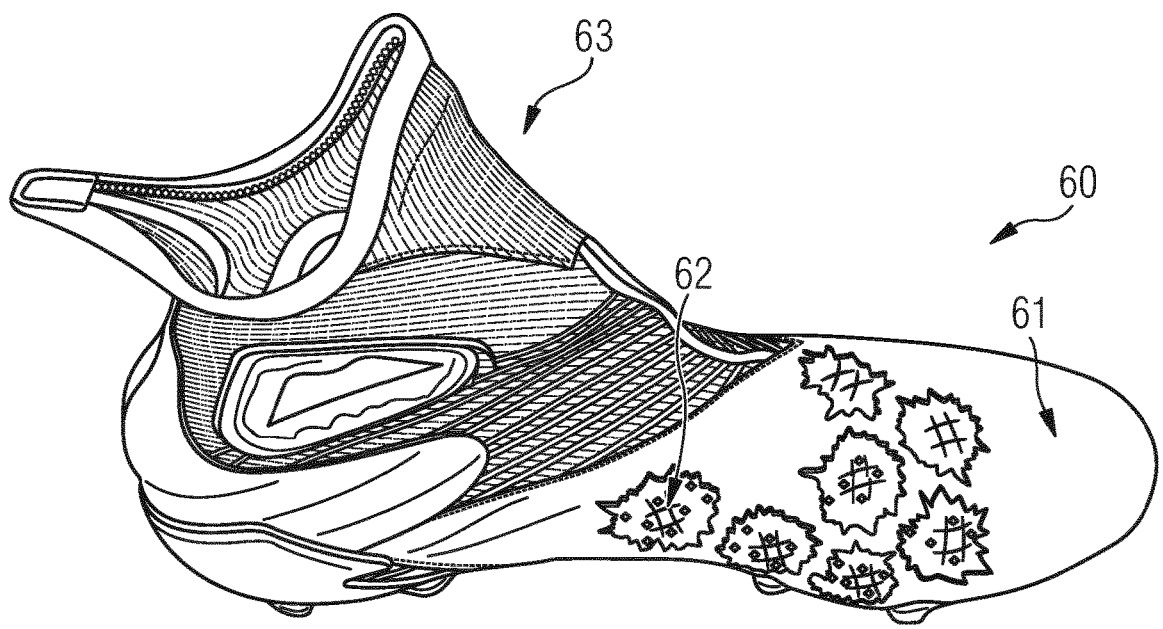
FIG. 6A: An example of a preferred embodiment of a shoe according to the invention showing a side view of the shoe.
Figure 6B:
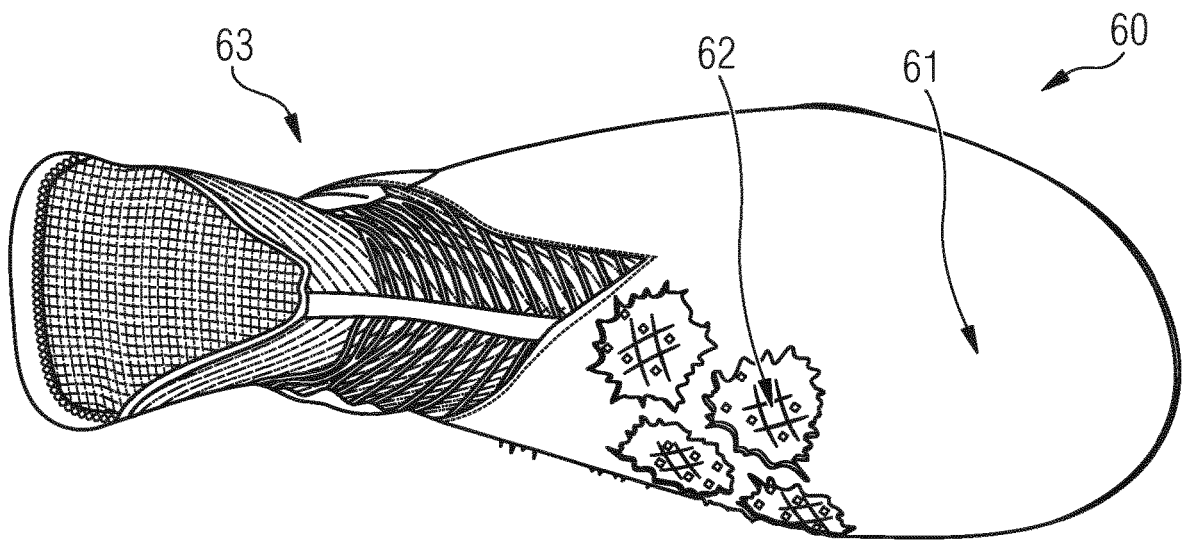
FIG. 6B: The example of FIG. 6A showing a front view of the shoe.

FIGS. 6A and 6B show an embodiment of a shoe 60 according to the present invention. The shoe 60 includes an upper 63 which is connected to shoe sole. The upper 63 includes an inner layer (not visible in FIGS. 6A and 6B) and an outer layer 61 made of rubber. In an alternative embodiment, the inner layer may be made of foam. The outer layer 61 includes cuts 62 at positions where the inner layer includes protrusions (see FIG. 6B). The cuts 61 and their associated protrusions are mainly arranged on a medial side of the upper 63.

In the embodiments of the FIGS. 1-6B the outer layer includes a greater hardness compared to the inner layer. In other embodiments the outer layer may include less hardness in comparison to the inner layer. Due to this, the inner layer may have a high energy return, which can create a trampoline effect, wherein the coefficient of restitution between the boot and the ball may increase.

FIG. 7A shows an illustration of a manufacturing process of an upper according to the present invention. To this end, a 3-plate mold construction (not shown in FIG. 7A) is used in one embodiment. An outer layer 71 of the upper is placed in a first cavity formed between a first plate and a second plate of the mold construction. An inner layer 72 of the upper is placed in a second cavity between the second plate and a third plate of the mold construction. The mold compression process (indicated by the arrow in FIG. 7A) joins the layers 71 and 72. Moreover protrusions are formed in the inner layer 72 by the mold process. One of the mold plates acts as a cutter which creates the intended cuts at least in the outer layer 72 of the upper. In some embodiments, the cutter also creates cuts in at least some of the protrusions of the inner layer 71 as described herein. The molding process may be a two-stage process, i.e. a hot and a cold press.

FIG. 7B shows an illustration of an alternative manufacturing process of an upper of shoe according to the present invention. In this case a mold construction (not shown in FIG. 7B) with three cavities and four plates is used, wherein an outer layer 71 of the upper is placed in the first cavity between the first and the second plate, a textile layer 73 is placed in the second cavity between the second and the third plate and an inner layer 72 is placed in the third cavity between the third and the fourth plate. The mold compression process (indicated by the arrow in FIG. 7A) joins the layers 71, 72 and 73 such that the textile layer 73 is arranged between the outer layer 71 and the inner layer 72 and the inner layer 72 forms at least one protrusion.

Figure 7C:
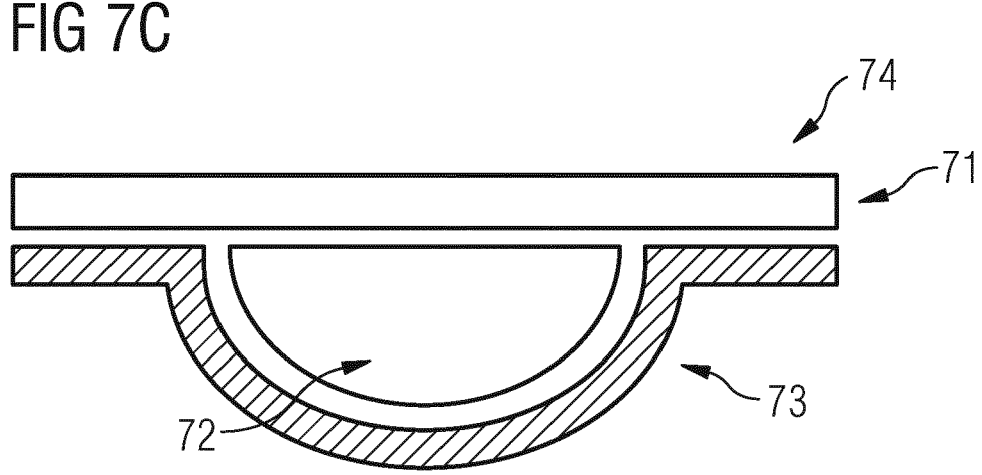
FIG. 7C: A graphical illustration of another embodiment of a manufacturing process of an upper according to the invention showing an outer layer, a textile layer and an inner layer, wherein the textile layer is positioned on the backsides of the inner layer and of the outer layer.

FIG. 7C shows an illustration of an alternative manufacturing process of an upper 74 of a shoe according to the present invention. Here, a 3-plate mold construction is used like in FIG. 7A, wherein an outer layer 71 and an inner layer 72 are directly mounted together. A textile layer 73 is bonded on a backside of the outer layer 71 as well as on a curved side of the protrusion 72 and forms a continuous surface.

Figure 7D:
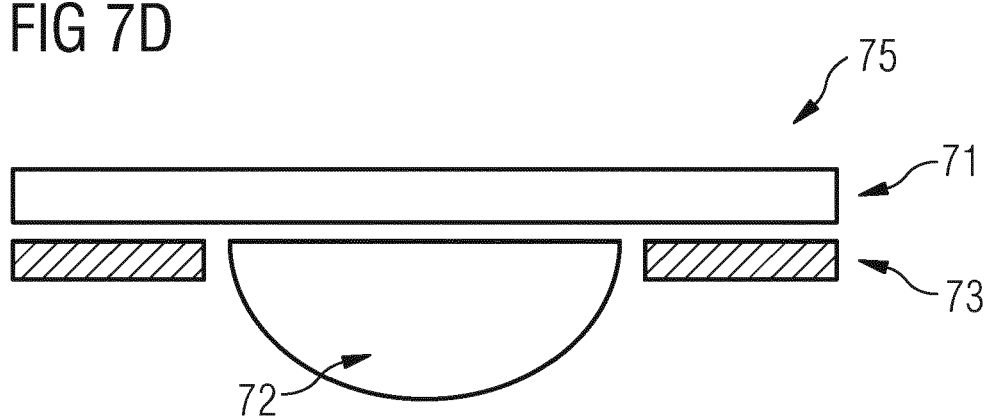
FIG. 7D: A graphical illustration of another embodiment of a manufacturing process of an upper according to the invention showing an outer layer, a textile layer and an inner layer, wherein the textile layer is positioned only on the backside of the outer layer.

FIG. 7D shows an illustration of an alternative manufacturing process of an upper 75 of a shoe according to the present invention. Similar to FIG. 7C a 3-plate mold construction is used and the outer layer 71 and the inner layer 72 are directly attached to each other. A textile layer 73 includes holes such that this perforated layer 71 covers only the backside of the outer layer 71.

By varying the temperature, pressure as well as the time during the molding compression process one can achieve different mechanical properties like tension strength and/or binding strength of the respective layer of the shoe upper. The inner and the outer layer could also be combined at different stages and not in a single step as mentioned before. Likewise, the curing process can be achieved in one step or in a plurality of separate steps. In case of a process with a single step, one mold plate may act like a cutter as described with respect to FIG. 7A.

FIGS. 8A and 8B show an illustration of an exemplary manufacturing process according to the embodiments in the FIGS. 1-6B of the present invention. The manufacturing process generally includes a first group of manufacturing steps which are illustrated in FIG. 8A and a second group of manufacturing steps which are illustrated in FIG. 8B.

In FIG. 8A the manufacturing and joining of the inner layer and outer layer according to the embodiments in the FIGS. 1-6B of the present invention is illustrated. In a first step 81, an outer layer (denoted as "top element" in FIG. 8A) and an inner layer (denoted as "reveal element" in FIG. 8B) are provided. The outer layer includes rubber with a thickness of 1-1.5 mm and a hardness of 50-70 Shore A. The inner layer includes rubber with a weight of 0.5-0.6 g and a volume of 0.5072 cm$^3$ as well as a hardness of 20-50 Shore A. In other embodiments different materials can be used with different thicknesses as well as hardnesses (between 30-50 Shore A), whereby the outer layer should be less soft than the inner layer.

In method step 82, the outer layer and the inner layer are pressed separately in a hot press for 20 seconds. The hot press process is defined by a pressure force of 160 kg/cm$^2$ at a temperature of 180° C. In step 83, both layers are cooled down for 70 seconds with no excess pressure at a temperature of 10-15° C.

After cleaning the layers in step 84, the outer layer and the inner layer are joined by a hot press step 85 with a duration of 180 seconds at a pressure of 160 kg/cm$^2$ and a temperature of 180° C. Subsequently, the joined layers are cooled down in step 86 for 40 seconds with no excess pressure at a temperature of 10-15° C. Finally, the compressed layers are cleaned in step 87 (the resulting element 88 is denoted "element" in FIG. 9A).

In a second alternative method 80B the hot press 82 can be done for 180 seconds and the cold press 83 for 40 seconds.

Further, in the alternative method 80B, in step 84, the outer and the inner layer is cleaned, a primer is applied and both layers are baked separately at 50-55° C. for 180 seconds. A joining of the two layers occurs during a hot press step 85 for 25 seconds at a pressure of 20 kg/cm$^2$ and a temperature of 150° C. Furthermore, a cold press step 86 can be applied with a pressure of 20 kg/cm$^2$ and a duration of 20 seconds at a temperature of 10-15° C. The joined layers are cleaned in step 87 in the alternative method 80B.

Figure 9A:
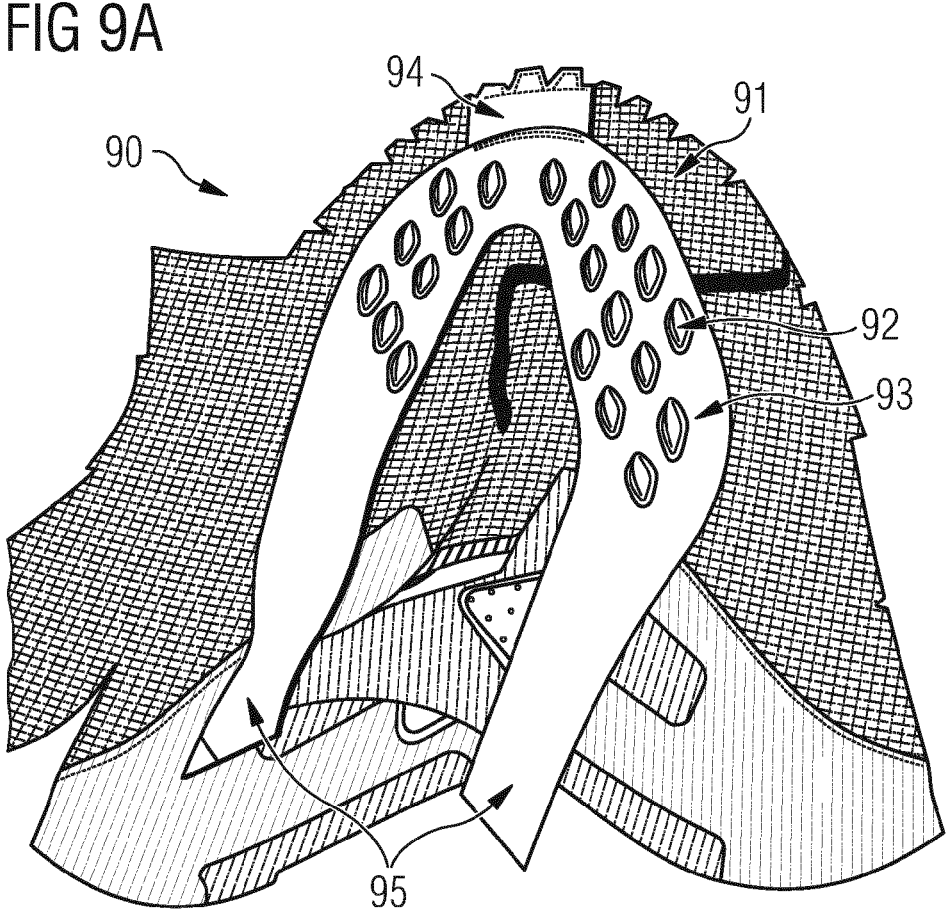
FIG. 9A: An example of another aspect of the present invention showing a shoe upper with a lining and an inner layer, wherein the inner layer features a plurality of protrusions.

In some embodiments an additional textile layer between the outer layer and the inner lay as well as alternatively or additionally a textile layer on top of the outer layer can be provided in the group of process steps illustrated in FIG. 9A by adapting the process accordingly.

FIG. 8B illustrates the process of joining the element 88 obtained by the group of steps of FIG. 8A (the "element") to an upper element to obtain an upper according to the invention. In step 89a, the element 88 obtained by the group of steps of FIG. 8A is provided. In step 88b, an upper element is provided, which refers to a base textile. In step 810, the element 88a is cleaned. Primers are applied to both the element 88 and the upper element in steps 811a and 811b, respectively. The primers may be applied by a screenprinting process. In step 812, the element 88 is subject to a heat treatment in a heat chamber for 180 seconds at 50-55° C. In steps 813a and 813b, respectively, cement is applied to both the element 88 and the upper element.

In step 814, the element 88 is subject to laser cleaning. Exemplary process parameters of this step include a mark speed of 700.000 mm/s, a jump speed of 2.000.000 mm/s, a frequency of 7 MHz and an energy of 60% of the maximum energy of the laser of 180 W. In step 815, which may be performed simultaneously with step 814, the upper element is conditioned for three hours.

In step 816, the conditioned upper element and the laser cleaned element 88 are compressed and joined in hot press at a pressure of 20 kg/cm² and a temperature of 150° for 25 seconds. This step is followed by a cold press step 917 with the same pressure, but a temperature of 10-15° C. for 20 seconds. In some embodiments, steps 816 and 817 of the manufacturing process can be combined into a single step.

Figure 9B:
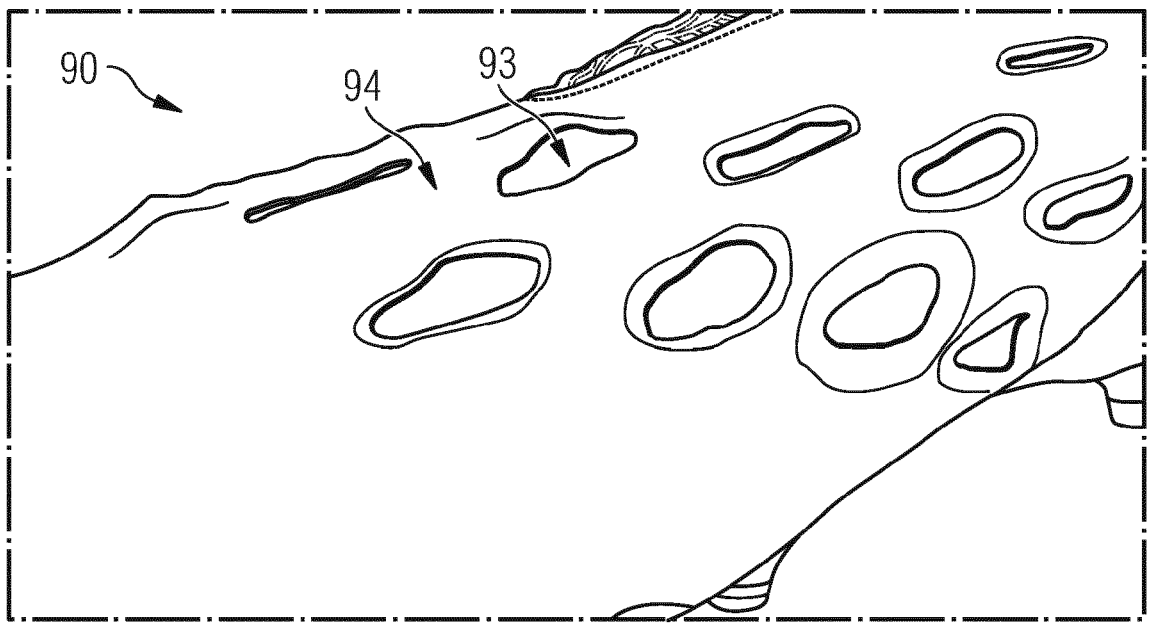
FIG. 9B: The example of FIG. 9A showing a shoe upper with an outer layer covering the inner layer, wherein the outer layer includes a plurality of cuts, which are not coinciding with the protrusions of the inner layer.

FIGS. 9A and 9B show an embodiment of another aspect of the present invention, namely an upper 90 with a movable inner layer. The upper 90 includes an inner layer 93, a textile layer 91 and an outer layer 94. As shown in FIG. 9A, the inner layer 93 includes a plurality of protrusions 92 having the shape of a pyramid. The inner layer 93 is made off non-stretch rubber (TPU) and is arranged on a textile layer 81 that acts like a lining in the final shoe. The inner layer 93 is connected to the textile layer 91 by a stretch element 94 made which is made of a textile in the preferred embodiment. In generally, other elastic materials like e.g. rubber, spandex could be used as well. With assistance of the stretch element 94, which is located in the toe area of the shoe upper 90, the non-stretchable inner layer 93 can partially float between a textile layer and an outer layer 94. The outer layer 94, which is shown in FIG. 8B, includes a plurality of cuts, which—in a first position—do not coincide with the protrusions 92 of the inner layer 93. A lug 95, located at the heel area, is formed by the inner layer 93. The lug 95 is automatically pushed when a wearer steps in the shoe, because then the heel of the foot interacts with the lug 95. When the lug 95 is pushed by the heel of the foot, the inner layer 93 moves relative to the outer layer 94, such that the protrusions 92 protrude outwards through the cuts of the outer layer 94, when the shoe is worn.

In the following, embodiments of the additional aspect of the invention relating to an upper with a movable inner layer are described.

1. Upper for a shoe comprising:
    an inner layer;
    an outer layer overlapping the inner layer at least partially;
    wherein the outer layer comprises a plurality of cuts;
    wherein the inner layer comprises a plurality of protrusions;
    wherein each cut is associated with at least one protrusion;
    wherein the inner layer is movable with respect to the outer layer between a first position and a second position;
    wherein in the first position, the protrusions are covered by the outer layer and wherein in the second position, each protrusion protrudes through its associated cut at least partially.
2. Upper according to embodiment 1, wherein the upper further comprises a stretchable piece that connects the inner layer to the outer layer and/or an optional lining.
3. Upper according to embodiment 2, wherein the stretchable piece is located in the forefoot region of the upper.
4. Upper according to one of embodiments 1-3, wherein the inner layer comprises a non-stretchable material.
5. Upper according to embodiment 4, wherein the inner layer comprises thermoplastic polyurethane (TPU).
6. Upper according to one of embodiments 1-5, wherein the inner layer forms a lug at the heel region.
7. Upper according to one of embodiments 1-6, wherein the stretchable piece and/or the inner layer and/or the outer layer comprises rubber or a textile.
8. Upper according to one of embodiments 1-7, wherein the first position of the movable inner layer is an initial position.
9. Upper according to one of embodiments 1-8, wherein the second position of the movable inner is reached when the shoe is worn.
10. Upper according to one of embodiments 1-9, wherein the outer layer comprises a textile layer coated on both sides.
11. Upper according to embodiment 10, wherein the cuts in the coatings of the outer layer are smaller than the cuts in the textile layer.
12. Upper according to one of embodiments 1-11, wherein the material of the outer layer and the inner layer comprises different hardnesses.
13. Upper according to embodiment 12, wherein the material of the outer layer comprises a greater hardness in comparison to the inner layer.
14. Upper according to one of embodiments 1-13, wherein the upper comprises a lining arranged underneath the inner layer.
15. Upper according to one of embodiments 1-14, wherein an outer side of the outer layer comprises a texture.
16. Upper according to one of embodiments 1-15, wherein the protrusions of the inner layer point outwards, such that they protrude through the cuts of the outer layer, when the inner layer is in the second position.
17. Upper according to one of embodiments 1-16, wherein the upper comprises a textile layer arranged on an outer surface of the outer layer.
18. Upper according to embodiment 17, wherein the protrusions of the inner layer are only arranged on the medial and/or lateral side of the upper.
19. A shoe comprising:
    an upper according to one of embodiments 1-18; and
    a sole attached to the upper.
20. A method of manufacturing an upper for a shoe, comprising the steps:
    providing an inner layer;
    providing an outer layer, such that the outer layer overlaps the inner layer at least partially;
    providing a plurality of cuts in the outer layer;
    providing a plurality of protrusions on the inner layer, such that each cut is associated with at least one protrusion; and
    providing a movable inner layer with respect to the outer layer between a first position and a second position such that in the first position the protrusions are covered by the outer layer and in the second position, each protrusion protrudes through its associated cut at least partially.
21. Method of manufacturing an upper for a shoe according to embodiment 20, further comprising the steps:
    providing a compression mold with at least two plates.
22. Method of manufacturing an upper for a shoe according to embodiments 21, further comprising the steps:
    providing that at least one of the mold plates acts as a cutter.

23. Method of manufacturing an upper for a shoe according to one of embodiments 21-22, wherein the material of outer layer and the inner layer comprises different hardnesses.
24. Method of manufacturing an upper for a shoe according to embodiment 23, wherein the material of the outer layer comprises a greater hardness in comparison to the inner layer.
25. Method of manufacturing an upper for a shoe according to one of embodiments 21-24, further comprising the step: providing a stretchable piece which connects the inner layer to the outer layer and/or an optional lining.
26. Method of manufacturing an upper for a shoe according to one of embodiments 21-25, further comprising the step: placing the stretchable piece in the forefoot region of the upper.
27. Method of manufacturing an upper for a shoe according to one of embodiments 21-26, wherein the inner layer comprises a non-stretchable material.
28. Method of manufacturing an upper for a shoe according to one of embodiments 21-27, wherein the inner layer comprises TPU or a textile.
29. Method of manufacturing an upper for a shoe according to one of embodiments 21-28, wherein the stretchable piece and/or the inner layer and/or the outer layer comprise rubber.
30. Method of manufacturing an upper for a shoe according to one of embodiments 21-29, further comprising the step: forming the inner layer in the heel region as a lug.
31. Method of manufacturing an upper for a shoe according to one of embodiments 21-30, further comprising the step: forming the outer layer as a textile layer and coating the textile layer on both sides.
32. Method of manufacturing an upper for a shoe according to embodiments 31, further comprising the step: forming the cuts in the coatings of the outer layer smaller than the cuts in the textile layer.
33. Method of manufacturing an upper for a shoe according to one of embodiments 21-31, further comprising the step: arranging a lining underneath the inner layer.
34. Method of manufacturing an upper for a shoe according to one of embodiments 21-33, further comprising the step: providing the outer side of the outer layer with a texture.
35. Method of manufacturing an upper for a shoe according to one of embodiments 21-34, further comprising the step: arranging the protrusions of the inner layer such that the protrusions face outwards and protrude through the cuts of the outer layer when the inner layer is in the second position.
36. Method of manufacturing an upper for a shoe according to one of embodiments 21-35, further comprising the step: arranging a textile layer on an outer surface of the outer layer.
37. Method of manufacturing an upper for a shoe according to embodiments 36, further comprising the step: arranging the protrusions only on the medial side of the upper.

In any various embodiments, an upper comprising an inner layer and an outer layer, wherein the material of the outer layer and the inner layer comprises different hardnesses.

In any various embodiments, wherein the upper further comprises a lining arranged underneath the inner layer.

In any various embodiments, wherein the upper further comprises a textile layer arranged between the outer layer and the inner layer.

In any various embodiments, wherein the inner layer is only arranged on the medial or lateral side of the upper.

In any various embodiments, a shoe comprising an upper according to one of claims 1; and a sole attached to the upper.

In any various embodiments, a method of manufacturing an upper for a shoe, wherein the first temperature is a range of 150-180° C. and the second temperature is in a range of 10-15° C.

In any various embodiments, wherein the inner layer comprises a foam material.

In any various embodiments, wherein the material of the outer layer and the inner layer comprises different hardnesses.

In any various embodiments, wherein the material of the outer layer comprises a greater hardness in comparison to the inner layer.

In any various embodiments, the method of manufacturing an upper for a shoe, further comprising the step: arranging a textile layer between the outer layer and the inner layer.

In any various embodiments, the method of manufacturing an upper for a shoe, further comprising the step: providing a plurality of cuts coinciding with the cuts of the outer layer of the textile layer.

In any various embodiments, the method of manufacturing an upper for a shoe, further comprising the step: providing an exterior texture of the outer layer with a plurality of protrusions.

In any various embodiments, the method of manufacturing an upper for a shoe, further comprising the step: placing the protrusions of the inner layer facing inwards such they point in the direction of a foot of a wearer of the shoe.

In any various embodiments, wherein the protrusions of the inner layer comprise a hemispherical shape, an elongated shape, or a rib shape.

In any various embodiments, wherein the inner layer comprises at least two unconnected portions, wherein each portion comprises at least one protrusion.

What is claimed is:
1. An upper for a shoe, the upper comprising:
an inner layer;
an outer layer overlapping the inner layer at least partially;
wherein the outer layer comprises a plurality of cuts;
wherein the inner layer comprises a plurality of protrusions and a continuous layer connecting the plurality of protrusions, and the plurality of protrusions is located on an opposite side of the continuous layer from the outer layer;
wherein each cut overlaps at least partially at least one protrusion such that each protrusion has at least one corresponding overlapping cut among the plurality of cuts;
wherein each protrusion among the plurality of protrusions is configured to cause an extension in width of its at least one corresponding overlapping cut when the shoe is worn.
2. The upper according to claim 1, wherein the outer layer or the inner layer comprises rubber.
3. The upper according to claim 1, wherein the inner layer comprises a foam material.
4. The upper according to claim 1, wherein a material of the outer layer comprises a greater hardness in comparison to the inner layer.
5. The upper according to claim 1, wherein the outer layer and the inner layer comprise different thicknesses.

6. The upper according to claim 1, wherein the upper further comprises a textile layer that comprises a plurality of cuts coinciding with the plurality of cuts of the outer layer.

7. The upper according to claim 1, wherein an exterior texture of the outer layer comprises a plurality of protrusions.

8. The upper according to claim 1, wherein the protrusions of the inner layer are facing inwards, such that they point into a foot receiving cavity defined within the upper.

9. The upper according to claim 1, wherein the protrusions of the inner layer comprise a hemispherical shape, an elongated shape, or a rib shape.

10. The upper according to claim 1, wherein the inner layer comprises at least two unconnected portions, wherein each portion comprises at least one protrusion.

11. The upper according to claim 1, wherein the upper comprises a textile layer arranged on an outer surface of the outer layer.

12. A method of manufacturing the upper for a shoe of claim 1, the method comprising the steps:
providing the inner layer;
providing the outer layer, such that the outer layer overlaps the inner layer at least partially;
providing the plurality of cuts in the outer layer; and
providing the plurality of protrusions on the inner layer, such that each cut overlaps at least partially at least one protrusion such that each protrusion has a corresponding overlapping cut among the plurality of cuts and such that each protrusion is configured to cause the extension of width of its corresponding overlapping cut when the shoe is worn.

13. The method of manufacturing the upper for a shoe according to claim 12, further comprising the steps:
providing a compression mold with two cavities and three plates;
placing the outer layer in a first cavity between a first plate and a second plate; and
placing the inner layer in a second cavity between the second plate and a third plate.

14. The method of manufacturing the upper for a shoe according to claim 12, further comprising the steps:
providing a compression mold with three cavities and four plates;
placing the outer layer in a first cavity between a first plate and a second plate;
placing the textile layer in a second cavity between the second plate and a third plate; and
placing the inner layer in a third cavity between the third plate and a fourth plate.

15. The method of manufacturing the upper for a shoe according claim 12, further comprising the steps:
placing the inner layer and the outer layer in a mold at a first temperature and subsequently placing the inner layer and the outer layer in a mold at a second temperature, wherein the first temperature is higher than the second temperature.

16. The method of manufacturing the upper for a shoe according to claim 12, further comprising the step:
arranging a lining underneath the inner layer.

17. The method of manufacturing the upper for a shoe according to claim 12, further comprising the step:
arranging a textile layer on an outer surface of the outer layer.

18. The method of manufacturing the upper for a shoe according to claim 12, further comprising the step:
arranging the inner layer only on the medial side of the upper.

19. An upper for a shoe, the upper comprising:
an inner layer comprising a plurality of protrusions;
an outer layer positioned outward of the inner layer, overlapping the inner layer at least partially, movable relative to the protrusions, and comprising a plurality of cuts, wherein each cut at least partially overlaps a protrusion among the plurality of protrusions such that each protrusion has a corresponding overlapping cut among the plurality of cuts; and
wherein each protrusion among the plurality of protrusions is configured to cause an extension in width of its corresponding overlapping cut when the shoe is worn, and wherein the inner layer is movable relative to the outer layer such that each protrusion among the plurality of protrusions has a variable inward depth relative to its corresponding overlapping cut.

20. The upper of claim 19, wherein the inner layer is movable with respect to the outer layer between a first position in which the protrusions are covered by the outer layer and a second position in which each protrusion protrudes at least partially outward through its corresponding overlapping cut.

* * * * *